United States Patent [19]

Macrander et al.

[11] 3,917,909

[45] Nov. 4, 1975

[54] RING INJECTION METHOD FOR TRANSFORMER COUPLED TELEPHONE

[75] Inventors: Max S. Macrander, Warrenville; Ronald F. Kowalik, Lombard, both of Ill.

[73] Assignee: GTE Automatic Electric Laboratories Incorporated, Northlake, Ill.

[22] Filed: Mar. 7, 1974

[21] Appl. No.: 448,864

[52] U.S. Cl. ............................................ 179/18 HB

[51] Int. Cl.² ........................................... H04M 3/02

[58] Field of Search ............ 179/18 HB, 84 A, 84 R

[56] References Cited

UNITED STATES PATENTS

| | | | |
|---|---|---|---|
| 2,990,454 | 6/1961 | Delandy | 179/84 A |
| 3,312,787 | 4/1967 | Jorgensen | 179/84 R |

OTHER PUBLICATIONS

IBM Technical Disclosure Bulletin, Vol. 12, No. 11 (Apr., 1970), pp. 1759–1761.

*Primary Examiner*—Thomas W. Brown
*Attorney, Agent, or Firm*—James V. Lapacek

[57] ABSTRACT

A telephone communication network of the type which includes at least one transformer having a primary connected to a subscriber loop and a secondary connected to the telephone communication switching network for coupling the subscriber loop to the switching network, wherein the ring signal injection system comprises a ring generator for providing an electrical ringing signal and a switching means for connecting the ring generator in series with the transformer primary. The ringing signal is therefore injected directly into the transformer primary and translated through the primary to the subscriber telephone set ringer. As a result, only one set of switching contacts is required and transmission of the ringing signal through the transformer is avoided.

6 Claims, 3 Drawing Figures

RING INJECTION METHOD FOR TRANSFORMER COUPLED TELEPHONE

BACKGROUND OF THE INVENTION

The present invention is directed in general to a ringing signal injection system for a telephone communication network. More particularly, the present invention is directed to a ringing signal injection system for use in a transformer coupled telephone communication network.

Transformer coupled telephone communication networks are well known. To provide each subscriber loop access to the telephone switching circuitry, such systems include a transformer at each subscriber interface. The transformers have primary windings coupled to the subscriber loops and secondaries coupled to the telephone switching circuitry.

Ringing of a subscriber telephone set within one of the subscriber loops requires injection of a ringing signal into the subscriber loop. To accomplish this prior art systems of different varieties have been devised. For example, one system completely disconnects the subscriber loop from the coupling transformer and injects the ringing signal directly to the telephone set ringer. Another system transmits the ringing signal from the telephone switching circuitry through the coupling transformer into the subscriber loop. While both systems have shown some utility, systems of the first type tend to be complex requiring multiple switching contacts for disconnecting the subscriber loops from the coupling transformer primaries and the systems of the second type require rather high inductance, bulky transformers to transmit the relatively low frequency ringing signals.

It is therefore a general object of the present invention to provide an improved ringing signal injection system for a transformer coupled telephone communication network.

It is a more particular object of the present invention to provide a ringing signal injection system for a transformer coupled telephone communication system which is less complex and requires fewer switching contacts than the prior art systems.

It is a still further object of the present invention to provide a ringing signal injection system for a transformer coupled telephone communication network which avoids the transmission of ringing signals from the telephone switching circuitry to the subscriber loops to thus negates the need for high inductance, bulky coupling transformers.

In general, the present invention provides a ringing signal injection system for use in a transformer coupled telephone communication network wherein at least one transformer having a primary coupled to a subscriber loop and a secondary coupled to the telephone switching network couples the subscriber loop to the telephone switching network and wherein the subscriber loop has transducing means for transforming a ringing electrical signal to an audible ringing signal. The ringing signal injection system comprises a ring generator for providing an electrical ringing signal and switching means coupled to the transformer primary for connecting the ring generator directly in series with the transformer primary. The ringing electrical signal is therefore directly injected into the transformer primary to be translated to the subscriber loop transducing means and transformed into an audible ringing signal.

BRIEF DESCRIPTION OF THE DRAWINGS

The invention, together with further objects and advantages thereof, may best be understood by reference to the following description taken in connection with the accompanying numerals identify like elements, and in which.

DESCRIPTION OF THE PREFERRED EMBODIMENT

Figure 1:
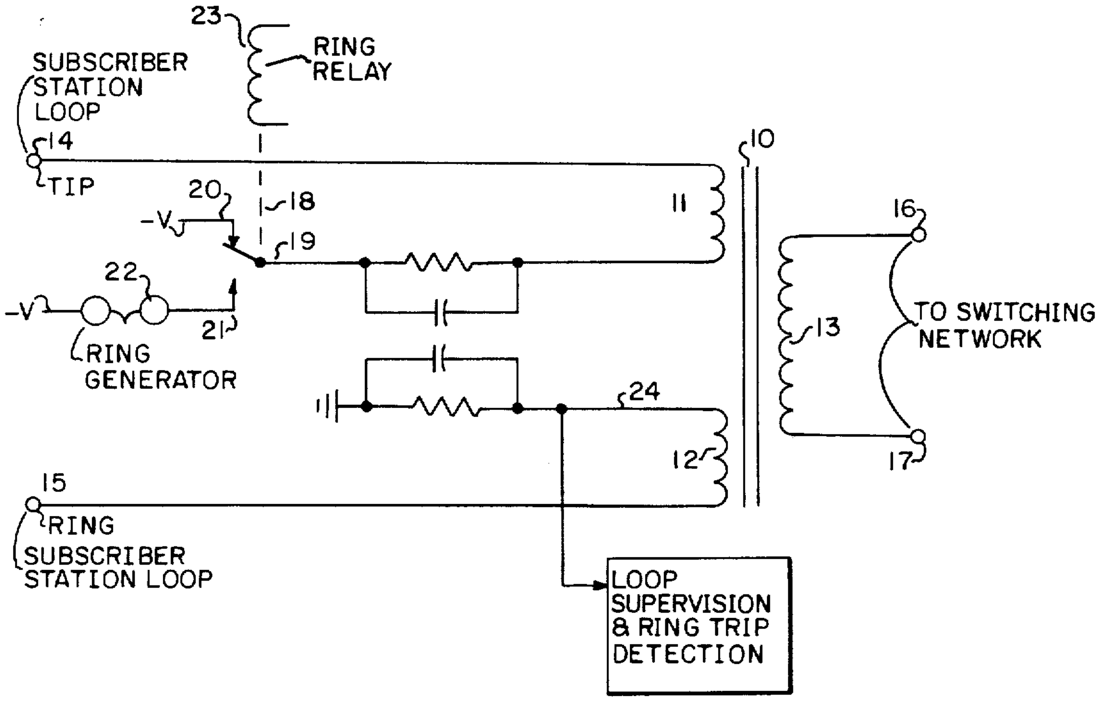
FIG. 1 is a simplified schematic circuit diagram of a ring injection system embodying the present invention.

Referring now to the drawings, FIG. 1 shows a simplified schematic circuit diagram of a ring injection system embodying the present invention in conjunction with a coupling transformer of a transformer coupled telephone communication network. Transformer 10 has primary windings 11 and 12 and secondary winding 13. Primary winding 11 has a terminal 14 which is connected to the TIP side of the subscriber station loop. Primary winding 12 has RING terminal 15 connected to the RING side of the subscriber station loop. The secondary 13 has terminals 16 and 17 which are adapted to be connected to the switching network of a telephone communication network.

At the side of primary winding 11 opposite TIP terminal 14 is a RING relay switching means 18 comprising armature spring 19 and contacts 20 and 21. Contact 20 is coupled to a −V power source which sustains the operation of the subscriber station loop. Terminal 21 is coupled to the series combination of RING generator 22 and the same −V power source which are utilized when the telephone in the subscriber station loop is to receive a ringing signal.

RING generator 22 is of the type well known in the art and provides, for example, a low frequency electrical ringing signal at approximately 50 Hertz and at an amplitude of 90 volts RMS.

Spring armature 19 is normally in contact with contact 20 to enable the −V power source coupled to contact 20 to sustain the operation of the subscriber station loop. When the subscriber station loop is to receive the ringing signal from RING generator 22, relay coil 23 receives current causing spring armature 19 to make contact with contact terminal 21 of switch 18. As can be seen in FIG. 1, when this occurs, RING generator 22 is connected in series with primary winding 11 so that the ringing signal provided by RING generator 22 may be translated through primary winding 11 into the subscriber loop.

The telephone receiver in the subscriber station loop includes a transducing means such as telephone ringer which transforms the electrical ringing signal provided by RING generator 22 into an audible ringing signal to indicate that the telephone receiver in the subscriber station loop is being called.

When spring armature 19 is in contact with contact terminal 21, a closed loop is formed including the RING generator 22, primary winding 11, the TIP side of the subscriber station loop, the RING side of the subscriber station loop, primary winding 12 and the path at side 24 of primary winding 12 to ground. As will be further explained subsequently, when the phone receiver in the subscriber station loop is taken off hook a DC path is provided within the system for causing spring armature 19 of ring relay 23 to return to the contact terminal 20 to terminate ringing of the telephone receiver and to enable the −V power source at contact 20 to sustain the operation of the telephone subscriber station loop.

Figure 2:
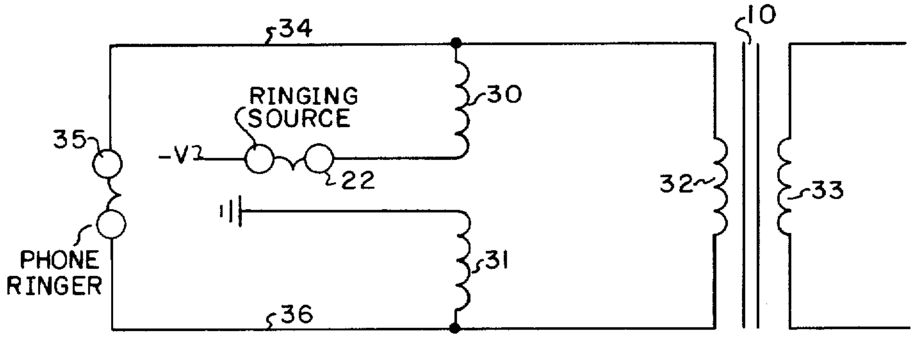
FIG. 2 is an equivalent low frequency schematic circuit diagram of the system of FIG. 1.

FIG. 2 shows the equivalent circuit diagram of the system shown in FIG. 1 when spring armature 19 is in contact with terminal 21 to provide ringing of the telephone ringer in the subscriber station loop. As can be seen in FIG. 2, transformer 10 in this low frequency condition is equivalent to a transformer having inductance winding 30, inductance winding 31, coupling winding 32 and coupling winding 33. Inductance windings 30 and 31 represent inductances of the primary windings 11 and 12 of FIG. 1. Coupling windings 32 and 33 represent the ideal transformer coupling the primary windings and the secondary winding. RING generator 22 and the −V power source are in series with inductance 30 and a closed path is created through inductance 30, line 34, phone ringer 35, line 36 and back to ground through inductance 31. Because the ringing signal of the RING generator is injected directly into the subscriber station loop, transformer 10 may be of a relatively low inductance having a cut-off frequency substantially higher than the frequency of the ringing signals. Typically, transformer 10 may have a 3dB cut-off frequency of approximately 300 Hertz. Because transformer 10 is of a relatively low inductance, its effective impedance at the ringing frequency causes the ringing signals provided by RING generator 22 to experience insignificant attenuation. Also, because the cut-off frequency of transformer 10 is substantially higher than the frequency of the ringing signals there is very little feedback of the ringing signals into the telephone switching network through the secondary winding of the coupling transformer 10.

Figure 3:
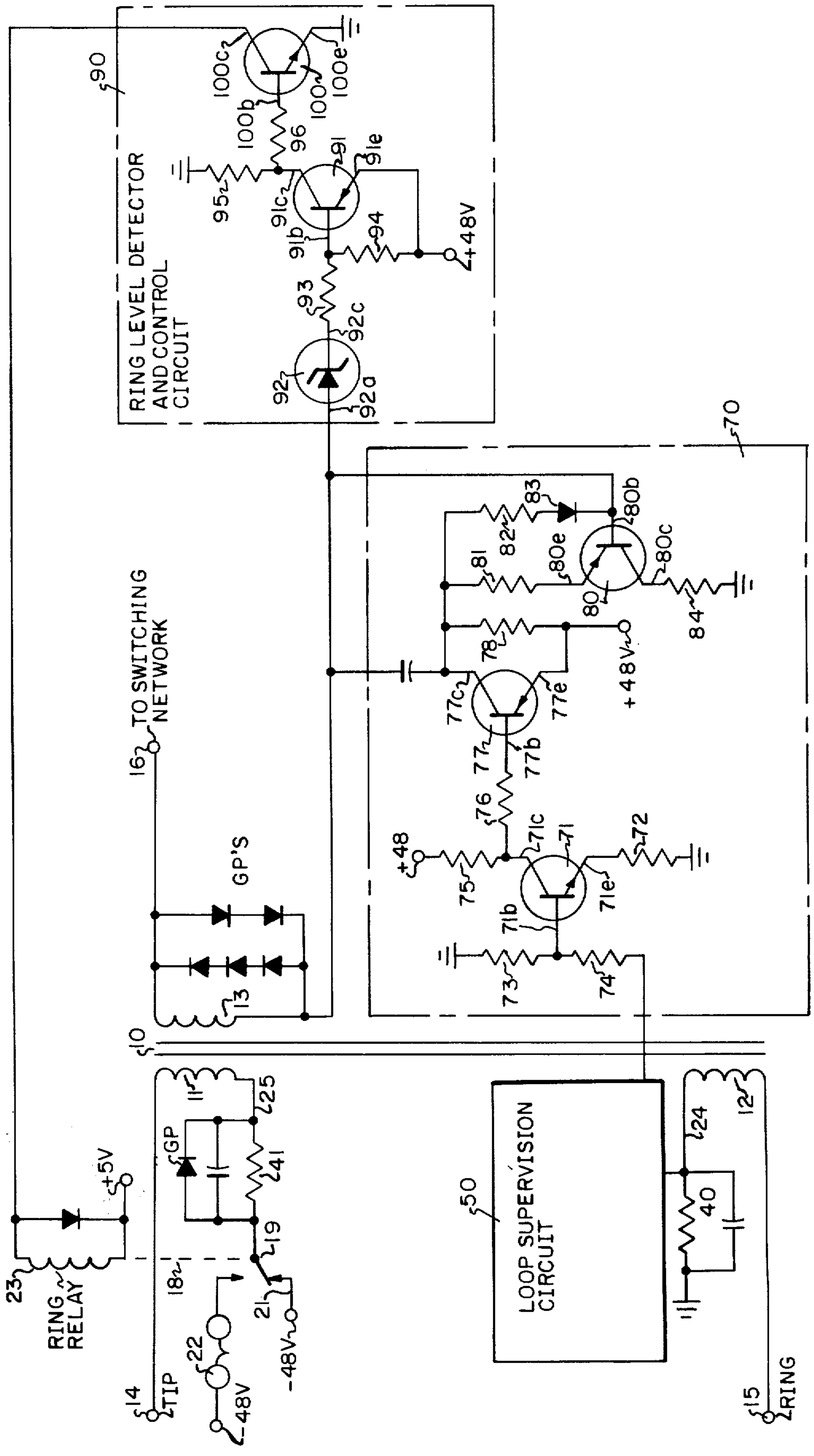
FIG. 3 is a more detailed schematic circuit diagram of a ring injection system and associated control circuitry embodying the present invention.

FIG. 3 shows the ringing injection system of the present invention in conjunction with its associated control circuitry. As in the embodiment shown in FIG. 1, the ring injection system of FIG. 3 includes relay 23 having spring armature 19, and contacts 20 and 21. Contact 20 is coupled to a series combination of RING generator 22 and a −V power source of −48 volts. Contact 21 is coupled to a −V power source also of −48 volts. Transformer 10 has primary windings 11 and 12, primary 11 having TIP terminal 14 coupled to the TIP side of the subscriber station loop and primary winding 12 having RING terminal 15 coupled to the RING side of the subscriber station loop. Side 24 of primary winding 12 is coupled to ground through a resistor 40. Coupled in series between spring armature 19 and side 25 of primary winding 11 is resistor 41. Resistors 40 and 41 serve to provide a proper matching empedance for the subscriber station loop. The ring injection system also comprises associated control circuitry including loop supervision circuit 50, level generator circuit 70, and ring level detector and control circuit 90.

Loop supervision circuit 50 is shown in block form for purposes of brevity inasmuch as such circuits are well known in the art. Briefly, loop supervision circuit 50 provides a forward biasing current for the transistor 71 of the level generator circuit 70 in response to the telephone receiver in the subscriber station loop being taken off hook. This in turn turns transistor 77 into saturation, thereby bypassing resistor 78. As a result of this the voltage appearing at the ring level detector circuit 90 is increased, enabling the ring level detector circuit to sense the off-hook condition.

Level generator circuit 70 comprises transistors 71, 77 and 80. Emitter 71*e* of transistor 71 is coupled to ground through resistor 72. Base 71*b* is coupled to ground through resistor 73 and also to the loop supervision circuit through resistor 74. Collector 71c is coupled to, for example, a +48 volt power source by resistor 75 and also to base 77*b* of transistor 77 by resistor 76. A resistor 78 is coupled between collector 77*c* and emitter 77e of transistor 77. Emitter 77*e* is also coupled to a +48 volt power source.

Transistor 80 has emitter 80*e* coupled to collector 77*c* of transistor 77 by resistor 81. The base 80*b* of transistor 80 is coupled to the collector 77*c* of transistor 77 by the series combination of resistor 82 and diode 83. Collector 80*c* is coupled to ground through resistor 84.

The ring level detector 90 comprises transistors 91 and 100. Ring level detector 90 is coupled at base 91*b* of transistor 91 to the level generator circuit 70 at base 80*b* of transistor 80 by the series combination of zener diode 92 and resistor 93. Resistor 94 couples base 91*b* to a +48 volt power source and emitter 91*e* is also coupled to the +48 volt power source. Collector 91*c* is coupled to ground through resistor 95 and also to the base 100*b* of transistor 100 by resistor 96. Emitter 100*e* of transistor 100 is coupled to ground and collector 100*c* is coupled to the ring relay 23.

In order to facilitate the operation of the control circuitry of the ring injection system of the present invention, the telephone switching network coupled to terminal 16 of secondary 13 includes two current sinks, usually located at a junctor circuit, one current sink requiring less current than the other. The manner in which these current sinks are utilized will be explained in conjunction with the operation of the ring injection system.

In operation, assuming that a call has not been initiated to the telephone receiver in the subscriber station loop connected to terminal 14 and 15, the first current sink in the telephone switching network will cause a current to flow out of terminal 16 into the switching network. The current path originates at the +48 volt power source coupled to resistor 78. The current passes through resistor 78, resistors 81 and 82, through base 80*b*, into secondary winding 13 and out of terminal 16. Looking at the ring level detector and control circuit 90 for a moment, the control circuit 90 is responsive to the voltage appearing at anode 92*a* of zener diode 92. Because the zener diode at its cathode 92*c* is coupled to the +48 volt power source through resistors 93 and 94, and because the lesser current of the first current sink causes only a slight voltage drop across resistors 78 and 82, a relatively high voltage will result at anode 92a such that zener diode 92 is nonconductive. Therefore, transistors 91 and 100 will be off, ring relay 23 will not be activated and spring armature 19 will be in its normal position in contact with contact point 21.

When a call is initiated to the telephone receiver in the subscriber loop coupled to terminal 14 and 15, the second current sink in the telephone communication network is activated to cause a greater current to flow out of terminal 16 into the telephone switching network. When this occurs, there is a much greater voltage drop across resistors 78 and 82 which lowers the potential at anode 92*a* of zener diode 92 sufficiently to cause it to conduct and turn on transistors 91 and 100. The current supplied out of collector 100*c* of transistor 100 is translated to the ring relay 23 causing ring armature 19 to switch over to contact 20, placing the ring generator 22 in series with the primary 11 of coupling transformer 10. The electrical ringing signal generated by RING generator 22 is then translated through primary winding 11 out of terminal 14 into the subscriber loop to cause the telephone ringer to transform the electrical ringing signals to audible ringing signals.

At this point in the operation of the system a capacitor in series with the ringer within the telephone receiver of the subscriber loop is in series with the loop. Therefore, there is no DC path within the subscriber loop.

When the receiver within the subscriber loop is taken off hook, switching contacts within the telephone receiver remove the capacitor and consequently the ringer from the subscriber loop and subsequently provide a DC current path within the loop. This DC current originates at the −48 volt power source coupled to RING generator 22 and passes through spring armature 19, resistor 41, primary 11, into the loop via the telephone receiver, back through the RING side of primary winding 12, through resistor 40 and then to ground. This DC current is sensed by the loop supervision circuit 50 which provides a current to resistor 74 which turns on transistor 71. When transistor 71 turns on, transistor 77 also turns and shunts resistor 78 out of the circuit between base 80*b* of transistor 80 and the +48 volt power source. This reduces the voltage drop supplied by the level generator circuit 70 and raises the potential at zener diode anode 92*a* sufficiently to terminate its conduction. Transistors 91 and 100 are turned off and ring relay 23 is de-activated. Spring armature 19 then returns to its normal position in contact with 21 which connects the −48 volt power source to the subscriber loop to sustain its operation. The reduced voltage drop is also sensed in the junctor circuit and is used to turn off the second current sink.

It can therefore be seen that the present invention provides a ring injection system for a transformer coupled telephone network which requires only one set of relay contacts for establishing the ringing signal. Additionally, because the ringing signals are not transmitted through the coupling transformer, relatively low inductance coupling transformers may be utilized. Additionally, because low inductance transformers have a relatively high cut-off frequency there is insignificant feedback of the ringing signals into the telephone switching network.

While a particular embodiment of the invention has been shown and described, modifications may be made, and it is intended in the appended claims to cover all such modifications as may fall within the spirit and scope of the invention.

We claim:

1. A ringing signal injection and termination system for use in a transformer coupled telephone communication network having at least one transformer having a primary with a tip and a ring side connected to a subscriber loop and a secondary connected to a telephone switching network, further the subscriber loop is connected to the telephone switching network, and the subscriber loop has transducing means for transforming a ringing electrical signal to an audible ringing signal, said ringing signal injection and termination system comprising:

a ring generator means for producing an electrical ringing signal;

loop supervision means connected to the ring side of the transformer primary for producing an increased current output in response to off-hook conditions occurring within said loop;

level generator means connected to said loop supervision circuit and said tip side of the transformer primary for producing an increased voltage drop in response to an increased current output from said loop supervision network;

ring level detector and control means connected to said level generator means for producing an activating control current in response to said increased voltage drop from said level generator means; and switching means connected to the said tip side of the transformer primary and said ring generator means and to said ring level detector and control means, for automatically connecting said ring generator means to said tip side of the transformer primary and subsequently disconnecting it in response to said activating control current;

whereby the ringing electrical signal is injected directly into the transformer primary to be transmitted to the subscriber phone transducing means and transduced into an audible ringing signal.

2. A system in accordance with claim 1 wherein said switching means comprises:

a relay having a pair of contacts and an armature spring, one of said contacts being connected to said ring generator means and said armature spring being connected to said primary, said relay injecting said ringing signal into said communication network and subsequently cutting it off in response to said activating control current.

3. A system in accordance with claim 2 wherein said primary has first and second ends, said first end being connected to said subscriber loop and said second end being connected to said armature spring.

4. A system in accordance with claim 2 wherein said transformer primary comprises first and second primary windings each including first and second ends, wherein said subscriber loop comprises a TIP side and a RING side, and wherein said first end of said first primary winding is connected to said TIP side, said first end of said second primary winding is connected to said RING side, said second end of said first primary winding is connected to said armature spring and said second end of said second primary winding is connected to a reference potential.

5. A system in accordance with claim 4 wherein said reference potential is ground potential.

6. A system in accordance with claim 4 wherein said system additionally comprises first and second impedances, said first impedance connecting said spring armature to said second end of said first primary winding and said second impedance connecting said second end of said second primary winding to said reference potential.

* * * * *